May 14, 1968     L. GINSBURG     3,383,496
HIGH TEMPERATURE VACUUM FIRING PORCELAIN FURNACE
Filed Aug. 27, 1965     2 Sheets-Sheet 1
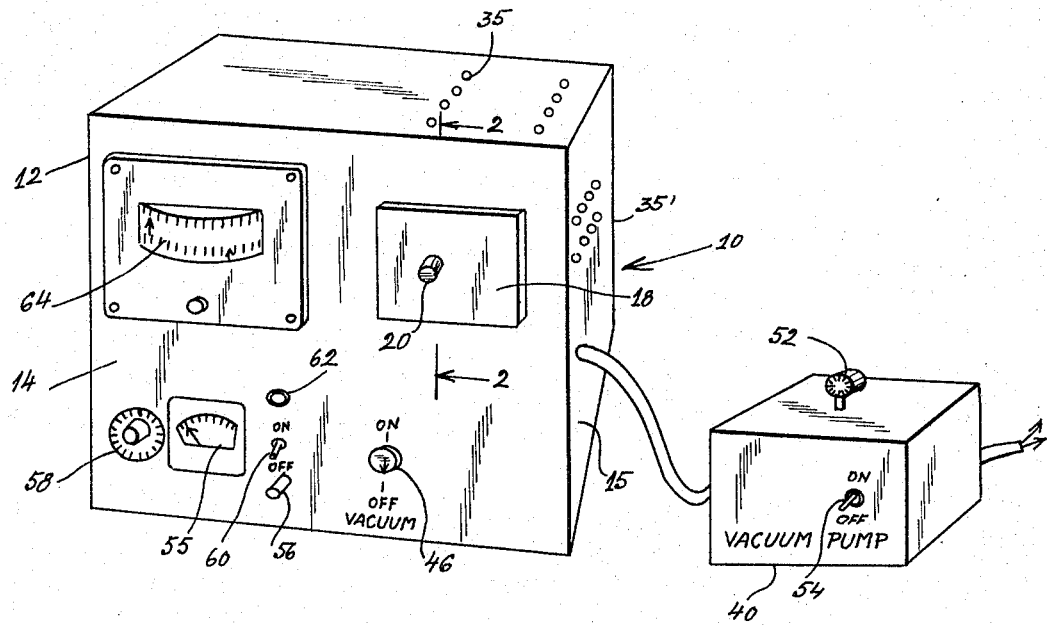
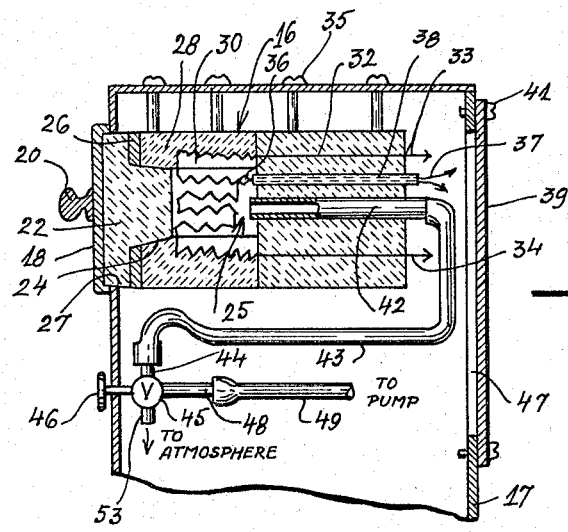
INVENTOR
Leon Ginsburg
BY
Polachek & Saulsbury
ATTORNEYS.

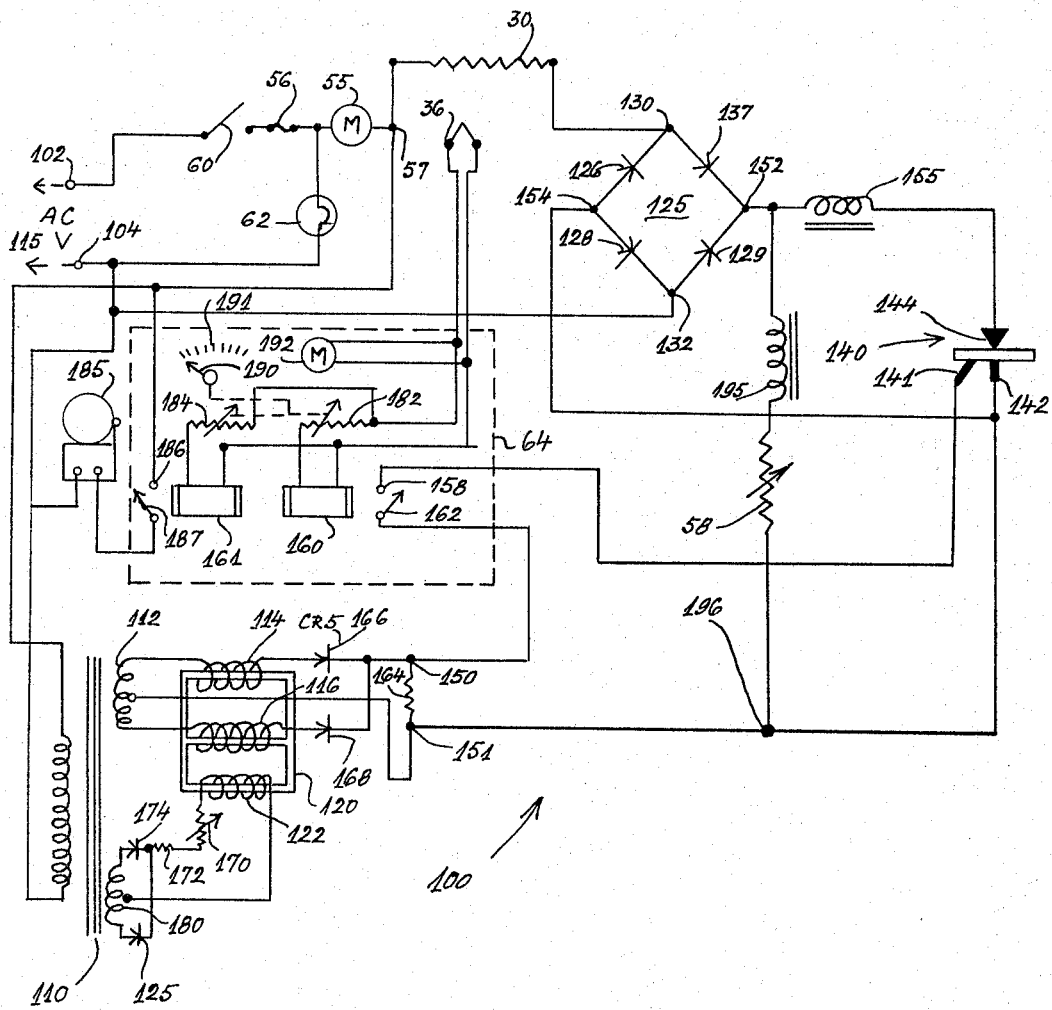

United States Patent Office 3,383,496
Patented May 14, 1968

3,383,496
HIGH TEMPERATURE VACUUM FIRING PORCELAIN FURNACE
Leon Ginsburg, Bronx, N.Y.
(244 Liberty Road, Tappan, N.Y. 10983)
Filed Aug. 27, 1965, Ser. No. 483,280
6 Claims. (Cl. 219—501)

ABSTRACT OF THE DISCLOSURE

A temperature and a firing rate control system for a heating chamber of a furnace whereby the temperature is maintained at a predetermined level in spite of changes in electrical resistance of a heater element used to heat the chamber, maintaining a predetermined time for the temperature level to be reached, thus allowing very accurate repeatable cycles. The system includes a power supply with a resistance heater element in series with the power supply. A silicon controlled rectifier is connected in series with the heater element, the rectifier normally maintained in a nonconductive condition. A magnet controls the rectifier, setting a certain current level in the heater element; a feedback circuit is provided in circuit with the heater element and amplifier to sense any change in current in the heater element and to restore said certain current level. A thermoelectric temperature meter with a thermocouple connected to the meter for measuring the exact temperature of the chamber. A relay is connected in circuit with the thermocouple meter and the rectifier arranged to open the circuit of the rectifier when the chamber is at a predetermined temperature.

---

This invention relates to a control system for a muffle furnace and more particularly concerns a system for maintaining the temperature of heating chamber in a muffle furnace at a predetermined level in spite of changes in electrical resistance of a heater element used to heat the chamber and maintains a predetermined time for said temperature level to be reached, thus allowing very accurate repeatable cycles.

In muffle furnaces used for processing high quality porcelain and ceramic dentures and other work pieces fabricated to precise dimensions, it is of utmost importance that the temperature at which the work pieces are processed be maintained at precisely determined constant working level.

It has been known heretofore to employ heater elements made of platinum wire in muffle furnaces in which the heater element is isolated from the heating chamber and is embedded in a refractory support. Use of platinum is desirable because of its ability to withstand the very high temperatures at which it must operate, without corroding, becoming brittle, etc. Considerable difficulty has been experienced with such heating elements in maintaining accurate and repeatable firing cycles in a heating chamber because of the platinum element tending to change its internal electrical resistance at different temperatures, and also during prolonged heating at any temperature, thus causing the current to change and therefore also the timing of the firing cycle.

The present invention is directed at overcoming this difficulty by providing a control system including the heating element in which any change in internal electrical resistance of the heating element is resulting in a change in electric current passing through the element is immediately effective to actuate a feedback circuit for applying a compensating voltage across the heating element. As a result the current passing through the element is either reduced or increased in such manner as to keep the total power dissipation of the heating element at a constant level, regardless of the changes in internal resistance of the heater element. Rather wide variations in electrical resistance as much as 5:1 can be compensated for by the present system.

Compensation is accomplished by use of a silicon controller rectifier used to rectify a compensating current in a feed back circuit including a magnetic amplifier to provide the compensating current. The magnetic amplifier is controlled by a control winding responsive to change in current passing through the heater element. The invention is applicable to a muffle furnace provided with means for maintaining a vacuum in the heating chamber.

It is therefore one object of the invention to provide a muffle furnace with a control system for maintaining a constant and repeatable firing cycle in a heating chamber heated by an electrical resistance heater element, in spite of wide variations in resistance of the heater element.

Another object is to provide a control system as described including a silicon controlled rectifier utilized as a gate or valve for passing a negative feedback current to the heater element to compensate for changes in current passing through the heater element due to changes in electrical resistance thereof.

A further object is to provide a control system as described, wherein the silicon controlled rectifier is controlled by means of a magnetic amplifier which supplies compensating currents in a feedback circuit to the heater element.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of the heating and control apparatus and the vacuum pump.

FIG. 2 is a fragmentary sectional view taken on line 2—2 of FIG. 1.

FIG. 3 is a wiring diagram of the control system.

In FIGS. 1 and 2 is shown an assembly 10 of apparatus including a cabinet 12 having a front panel 14 in which is mounted a muffle furnace 16. This furnace has a front door 18 provided with a forwardly extending handle or knob 20. Secured to the door is a rectangular refractory plug 22 which fits snugly into opening 24 of compartment 25 in the furnace. A silicone rubber gasket 26 may be provided between the rim 27 of the plug and front end of furnace body 28. Embedded in walls of the furnace body and surrounding the compartment 25 is an electrical heating element 30 preferably made of platinum-wound resistance wire. The compartment 25 is closed at its back end by a refractory block 32. Terminals of the resistance element are connected to wires 33, 34 which extend outwardly or rearwardly through the block 32 and are connected in circuit 100 described below in connection with FIG. 3. Bolts 35 and 35' support the furnace body 28 and block 32 inside cabinet 12 spaced from its walls.

A bimetallic thermocouple 36 extends out of the forward end of block 32 into compartment 25. This thermocouple is connected to wires 37 which extend through insulated tube 38 through block 32 and terminate at circuit 100. A back door 39 held by screws 41 closes opening 47 in rear wall 17 of the cabinet.

A vacuum pump 40 may be provided to maintain a vacuum in chamber 25 when required. Conduit 42 extends through block 32 and opens into the chamber 25. Connected to the outer end of conduit 42 is a pipe 43 which terminates at outlet nipple 44 of valve 45. The valve is controllable by a knob handle 46 located at the front panel 14. The valve has an inlet nipple 48 to which is connected conduit 49. This conduit is connected directly to the vacuum pump 40. The conduit passes through side wall 15 of the cabinet. The pump has a vacuum gauge 52 and a control switch 54 for turning the pump on and off. Valve 45 has an outlet nipple 53 open to atmosphere. In OFF position of handle valve 45 set by handle 46, nipple 44 is connected to nipple 53 to vent chamber 25 to atmosphere. In the ON position of valve 45 the vacuum pump 40 draws a vacuum in chamber 25 through the pipe 43, valve 45 and conduit 49.

A current reading ammeter 55 is located at the front panel 14 to indicate the electric current being drawn by the heater element 30. A fuse element 56, rheostat 58, power supply ON-OFF switch 60, indicator lamp 62, and pyrometer 64 are all located at the front panel 14. These components are all operatively connected in the circuit 100 shown in FIG. 3, to which reference is now made.

The system 100 shown schematically in FIG. 3 has a pair of power supply input terminals 102, 104 to which a suitable alternating current power supply is connected. In series with terminal 102 is switch 60, fuse 56 and ammeter 55. At junction point 57 are connected wires supplying electric current to the furnace heating resistor element 30 and to primary winding 106 of transformer 110. The secondary winding 112 of the transformer provides power to a magnetic amplifier including windings 114, 116 wound on magnetic core 120. Also wound on the core is a control winding 122.

A full wave rectifier bridge 125 including rectifiers 126–129 is connected in the circuit. Bridge terminal 130 is connected to one end of element 30. Opposite terminal 132 is connected to power supply terminal 104. A silicon controlled rectifier 140 including gate 141, cathode 142 and anode 144 is included in the circuit. Gate 141 is connected to the magnetic amplifier output terminal 150. Anode 144 is connected via control winding 155 to bridge terminal 152.

Gate 141 is also connected to relay contact 158 in the circuit of pyrometer 64. Relay 160 has a movable contact 162 normally open with respect to contact 158. Contact 162 is connected to magnetic output terminal 150. A resistor 164 is connected across output terminals 150, 151. Terminal 151 is connected to a center tap on secondary winding 112. Two rectifiers 166, 168 are connected between windings 114, 122 respectively and terminal 150.

Variable resistor 170 and fixed resistor 172 are connected in series with rectifiers 174, 175. These rectifiers are connected to opposite ends of another secondary winding 180 of transformer 110. A center tap on winding 180 is connected to control winding 122.

Thermocouple 36 which may include a bimetallic platinum rhodium element is connected to the coils of relays 160, 161 in the pyrometer 64. Variable resistors 182, 184 are provided in the pyrometer in series with the relay coils for setting operating points of the relays. Relay 161 operates a buzzer or other audible alarm 185 connected to normally open contacts 186, 187 of the relay. The pyrometer has a manually settable pointer 190 operatively connected to controls of resistors 182, 184 for setting them when pointer 190 is adjusted along scale 191 of the pyrometer. The pyrometer includes a voltmeter 192 connected across thermocouple 36 and calibrated to read temperature in the heating chamber 25 of the muffle furnace.

Variable resistor 58 is connected in series with a control winding 195 between rectifier terminal 153 and junction point 196 which is connected to cathode 141. Lamp 62 is connected at one terminal between fuse 56 and meter 55 and at the other terminal to the power supply terminal 104 to light and indicate when the system is drawing power from the external power supply.

In the system 100, the current passing through heater element 30 is set to a predetermined magnitude or level. This magnitude or level of current is maintained automatically even though the resistance of the platinum heater element 30 changes widely with change in temperature. This is accomplished as follows:

The voltage output of the magnetic amplifier windings 114, 116 at terminals 150, 151 is applied via relay contacts 158, 162 to the gate 141 of rectifier 140 when the relay contacts close. These contacts close when at least a predetermined current passes through the thermocouple 36 to energize relay 160. The voltage output of the windings 114, 116 is controlled by the current in control winding 122 which in turn is determined by the setting of resistor 170. The voltage applied to the gate 141 of rectifier 140 determines the magnitude of current flowing through the rectifier 140. and thus through the heater element 30. The rectifier 140 is connected in a control circuit which can be traced from terminal 102 through switch 60 which will be closed, fuse 56, meter 55, heater element 30, rectifier 127, control winding 155, anode 144, cathode 142, rectifier 128 and terminal 104.

As the temperature of heater element 30 increases, its resistance increases and thus the current passing through it will tend to decrease proportionately. To prevent this decrease in current compensating voltage is applied through a feedback circuit to the heater element to maintain the current level therethrough substantially constant.

The feedback circuit includes coil 155. Any change in current in heater element 30 is sensed by this coil and applied as a change to the magnetic amplifier. This causes a change in voltage output at amplifier terminals 150, 151 which acts on the rectifier 140 to raise the current therethrough so that the current in heater element 30 is increased to compensate for the decrease in its internal electrical resistance.

As the current through resistance heater element 30 initially drops due to its increase in electrical resistance, the feedback voltage or signal applied by coil 155 operates to increase the voltage across element 30 and increase the current restoring it to its preset level. As a result of this feedback action the voltage across rectifier 140 and the voltage between circuit points or terminals 153, 196 decreases. Winding 195 senses the voltage across rectifier 140 and across terminals 153, 196. The current in winding 195 is set by adjusting the setting of resistor 58, and operates as a negative feedback element. When the voltage across points 152, 196 decreases, the effect is to increase the current passing through heater element 30 thus helping to maintain the current therethrough at the preset level.

If the indication of meter 192 should exceed the preset reading of pointer 190 at scale 191, relay 161 will be energized and contacts 186, 187 will close to actuate the alarm 185, so that the operator or attendant of the apparatus can take remedial action.

The vacuum pump 40 can be operated by setting switch 54 to the ON position and by setting valve control handle 46 to ON position. This evacuates the air in chamber 25 so that work pieces in the chamber can be heated in vacuum. After processing of work is completed, the handle 46 is turned to OFF position and pump 40 can be turned off. This releases the vacuum in chamber 25 by admitting air through nipple 53.

There has thus been provided apparatus for processing work pieces in a muffle furnace under vacuum conditions in a heated chamber. The heating element which is isolated from the chamber remains at a fixed temperature so that the chamber remains at constant temperature even though the electrical resistance of the heater element changes.

While I have illustrated and described the preferred embodiments of my invention, it is to be understood that I do not limit myself to the precise constructions herein disclosed and that various changes and modifications may be made within the scope of the invention as defined in the appended claims.

What is claimed is:
1. A temperature control system for a heating chamber of a furnace, comprising:
   (a) An alternating current power supply;
   (b) a resistance heater element connected in series with said power supply and disposed for heating said chamber to a predetermined temperature;
   (c) a full wave rectifier having rectifiers connected in a four terminal bridge;
   (d) a variable resistor connected to a first terminal of said bridge,
      (1) a second terminal of said bridge being connected to said heater element,
      (2) a third terminal of said bridge being connected to said power supply, whereby rectified current passes through said heater element;
   (e) a silicon controlled rectifier having a gate, anode and cathode,
   (f) a thermocouple located in said chamber and responsive to temperature thereof;
   (g) a relay having a coil connected to said thermocouple and energized thereby;
   (h) (1) said relay having two normally open contacts; a magnetic amplifier including a magnetic core with three windings on said core;
   (i) a transformer having a primary winding connected to said power supply and having a pair of secondary windings,
      (1) two of said three windings being connected to opposite terminals of one of the secondary windings;
   (j) half wave rectifiers connected between one of said two contacts and said two windings respectively;
   (k) other half wave rectifiers connected to opposite terminals of the other secondary winding in circuit with the third one of the three windings;
      (1) said cathode being connected to the fourth terminal of the bridge and to a center tap of said one secondary winding,
      (2) said anode being connected to said first terminal of the bridge,
      (3) said gate being connected to said variable resistor and to the other of said relay contacts, whereby the silicon controlled rectifier is normally held biased in a nonconductive condition until current in said heater element is reduced from a predetermined value upon a change in electrical resistance of said heater element, whereby the silicon controlled rectifier is rendered conductive to increase current passing through said element to said predetermined value.

2. A temperature control system as claimed in claim 1, further comprising a control winding in series cricuit with said variable resistor, and another control winding in series with said emitter, whereby said transistor remains unresponsive to very slight changes in current in said heater element.

3. A temperature control system as claimed in claim 2, further comprising another variable resistor connected in circuit with said relay coil to limit current flow therethrough and for determining the current required to be passed by said thermocouple to energize said relay.

4. A temperature control system as claimed in claim 3, further comprising;
   (a) a second relay having another coil and another pair of normally open contacts;
   (b) a further variable resistor in circuit with said other coil for limiting current flow therethrough and for determining the current required in said other coil to activate said other relay; and
   (c) an audible alarm device connected between said power supply and said other pair of contacts;
      (2) said thermocouple being connected between one terminal of said further variable resistor and one terminal of said other coil, whereby said audible alarm device is activated when said other relay becomes actuated upon rise in temperature of said thermocouple above a value determined by the setting of said further variable resistor.

5. A temperature control system as claimed in claim 1, further comprising:
   (a) a second relay having another coil and another pair of normally open contacts;
   (b) a further variable resistor in circuit with said other coil for limiting current flow therethrough and for determining the current required in said other coil to activate said other relay; and
   (c) an audible alarm device connected between said power supply and said other pair of contacts;
      (2) said thermocouple being connected between one terminal of said further variable resistor and one terminal of said other coil, whereby said audible alarm device is activated when said other relay becomes actuated upon rise in temperature of said thermocouple above a value determined by the setting of said further variable resistor.

6. A temperature control system as claimed in claim 5, further comprising a control winding in series circuit with said variable resistor, and another control winding in series with said anode, whereby the silicon controlled rectifier remains unresponsive to very slight changes in current in said heater element.

References Cited

UNITED STATES PATENTS

| | | | |
|---|---|---|---|
| 3,102,689 | 9/1963 | Ditto | 219—501 X |
| 3,202,800 | 8/1965 | Phillips et al. | 219—501 X |
| 3,231,719 | 1/1966 | De Viney et al. | 219—501 X |

RICHARD M. WOOD, *Primary Examiner.*

L. H. BENDER, *Assistant Examiner.*